United States Patent
Sakai et al.

(10) Patent No.: US 7,081,194 B2
(45) Date of Patent: Jul. 25, 2006

(54) METHOD FOR TREATING ETA-CONTAINING WASTEWATER

(75) Inventors: Kimio Sakai, Hitachinaka (JP); Seigo Ichikawa, Chikuma (JP); Akihisa Kikuya, Nagano (JP)

(73) Assignee: MGE Engineering Corporation, Chikuma (JP)

( * ) Notice: Subject to any disclaimer, the term of this patent is extended or adjusted under 35 U.S.C. 154(b) by 105 days.

(21) Appl. No.: 10/783,488

(22) Filed: Feb. 19, 2004

(65) Prior Publication Data

US 2006/0118429 A1    Jun. 8, 2006

(51) Int. Cl.
*C02F 1/461* (2006.01)

(52) U.S. Cl. .................. 205/688; 205/742; 205/751

(58) Field of Classification Search ............. 205/688, 205/742, 751
See application file for complete search history.

(56) References Cited

U.S. PATENT DOCUMENTS 4,765,834 A * 8/1988 Ananthapadmanabhan et al. .............................. 423/8
5,613,239 A    3/1997 Obinata et al.
5,832,393 A    11/1998 Omata et al.

FOREIGN PATENT DOCUMENTS

| JP | 09-234471 | 9/1997 |
| JP | 09-239371 | 9/1997 |
| JP | 11-347559 | 12/1999 |

OTHER PUBLICATIONS

Machine translation of Japanese Application No. 08-046433 Sep. 9, 1997.*

* cited by examiner

*Primary Examiner*—Arun S. Phasge
(74) *Attorney, Agent, or Firm*—Jordan and Hamburg LLP

(57) ABSTRACT

ETA-containing wastewater discarded from a regenerator of a nuclear power plant with a pressurized water reactor is neutralized with sodium hydroxide to adjust the pH value, metals are precipitated and separated, the wastewater is thereafter supplied to a filtration apparatus and filtered, and then supplied to an electrolyzer to conduct electrolysis and reduce the COD value induced by ETA to below the environmental discharge limit standard value.

6 Claims, 3 Drawing Sheets

METHOD FOR TREATING ETA-CONTAINING WASTEWATER

BACKGROUND OF THE INVENTION

Field of the Invention

The present invention relates to a method for treating ethanolamine (ETA)-containing wastewater discarded from nuclear power plants and the like. In particular, the present invention relates to a method for electrolyzing ETA contained in regenerant wastewater of a condensate demineralizer and reducing the chemical oxygen demand (COD) value induced by the ETA to a level below the environmental discharge limit standard value.

ETA has been used as a secondary system corrosion inhibitor in nuclear power plants with pressurized water reactors (PWR). The ETA is poured via an ETA pouring unit into outlet water of condensate demineralizers of power plants with (PWRs).

Water containing ETA passes through a water feed system, a water feed heater, a stream generator, steam pipes, and a steam turbine and enters a condensor. Part of the stream of the stream turbine is extracted as steam for heating the water feed, passes through the water feed heater, and returns as a drain into the condenser.

ETA thus controls the corrosion of the secondary system of power plants with pressurized water reactors.

ETA-containing steam that entered the condenser is cooled, becomes a condensate, and is purified with a condensate filter and a condensate demineralizer and reused as water feed. The ETA is collected in the condensate demineralizer that purifies the condensate.

The condensate demineralizer is filled with a mixture of an anion-exchange resin and a cation-exchange resin. Those ion-exchange resins are transferred into a regenerator for each constant amount of water that passed therethrough and are regenerated with reagents after separation into anions and cations.

The quantity of regenerant water produced herein is, for example, 120 m³ and the ETA concentration thereof is, for example, 2000 PPM.

Due to regeneration of ion-exchange resins in the regenerator, the trapped ETA is discharged into regenerant wastewater. The COD value induced by the ETA present in the wastewater exceeds the environmental discharge limit standard value and the wastewater is, therefore, toxic.

For this reason, oxidation and decomposition have been conducted by adding sodium hypochlorite to the wastewater and, after detoxification, the wastewater was discharged into environment.

However, the following problems are associated with the aforementioned oxidation and decomposition treatment method.

(1) A reaction layer corresponding to the amount of wastewater is required. Further, reagents for treating the excess sodium hypochlorite after completion of the reaction and a reaction layer therefor are also required. Therefore, the scale of equipment corresponding to the wastewater amount is large and huge installation space is required.

(2) A large quantity of reagents is needed to decompose ETA to the prescribed concentration satisfying the requirements of environmental discharge limit standards.

(3) Because the reaction proceeds at a low rate, sodium hypochlorite has to be used in a sufficient excess with respect to the theoretic amount necessary for the reaction. Further, this amount has to be maintained for a set period.

Accordingly, methods for electrolytic treatment of the ETA-containing wastewater have been suggested (Japanese Patent Applications Laid-open Nos. 9-239371, 9-234471, 11-347559).

However, the electrolytic treatment capacity of those electrolytic treatment methods was decreased because metals, such as iron, that were contained in the wastewater were deposited as metal oxides on the anodes. As a result, the electrodes had to be cleaned and the deposited metal oxides had to be removed. When the concentration of metals in the wastewater is high, such a cleaning operation has to be conducted frequently.

However, because a large number, for example 1040, of electrode pairs are used, this cleaning operation requires significant time and labor. Moreover, if the cleaning operation is repeated too often, the electrodes are worn out and service life thereof is shortened.

With the foregoing in view, it is an object of the present invention to prevent the reduction in the electrolytic treatment capacity and also to prevent the electrodes from wear.

The method in accordance with the present invention comprises the steps of neutralizing ETA-containing wastewater with sodium hydroxide to adjust the pH value, precipitating and separating metals, then filtering with a filtration apparatus, then supplying to an electrolyzer and conducting electrolysis, and reducing the COD value induced by ETA to below the environmental discharge limit standard value.

DETAILED DESCRIPTION OF THE PREFERRED EMBODIMENT

Figure 1:
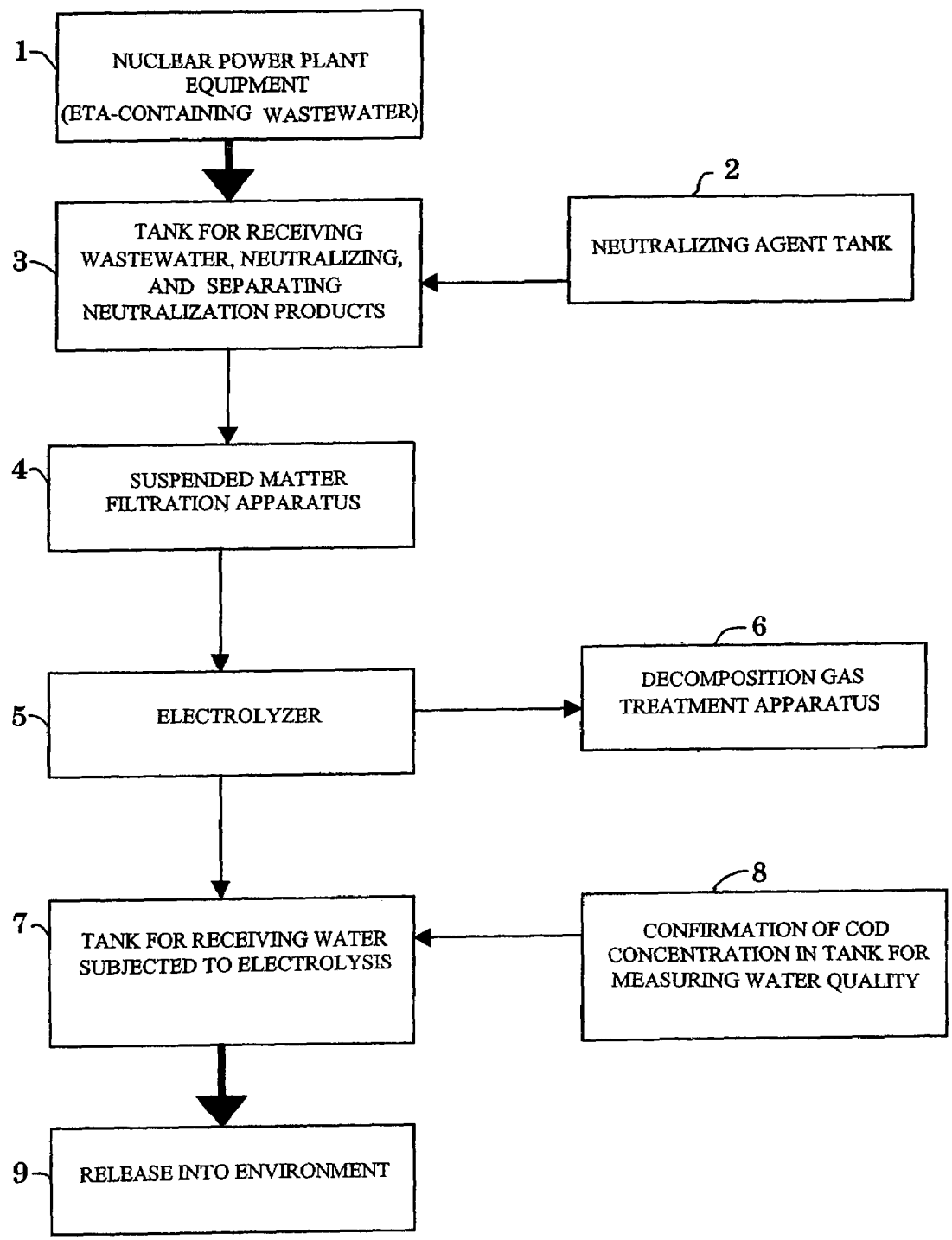
FIG. 1 is a block diagram illustrating a first embodiment of the present invention; this block diagram shows a basic configuration relating to a method for treating ETA-containing regenerant wastewater discarded from a nuclear power plant.

In equipment 1 of a power plant with a pressurized water reactor, wastewater comprising ETA is produced, as described hereinabove, from a condensate demineralizer and a regenerator. This water comprising ETA will be referred to as "ETA-containing wastewater". The ETA-containing wastewater is sulfuric wastewater and metals such as iron are contained therein. The volume of this wastewater is about 113 m³ and the ETA concentration is 2000 PPM.

This ETA-containing wastewater is supplied to a tank 3 for receiving wastewater and neutralizing and separating the neutralization products. A neutralizing agent, for example, a sodium hydroxide solution is poured from a neutralizing agent tank 2 into the tank 3. The components are stirred, neutralization of the ETA-containing wastewater is conducted, and the wastewater is adjusted to the prescribed pH value. This pH value is suitable for metal precipitation and separation and, for example, pH 8–12.5 is selected.

Metals such as iron are precipitated and separated as a precipitate in the tank 3 by the neutralization.

The neutralization can be also conducted prior to introduction into the tank 3, but in this case, the supply of a neutralizing agent at this stage has to be terminated or the adjustment of the supplied amount thereof has to be conducted.

Upon completion of the neutralization, the ETA-containing wastewater present in the tank 3 is supplied via a suspended matter filtration apparatus 4 into an electrolyzer 5 and subjected to electrolysis.

The filtration apparatus 4 removes metal ion impurities or suspended substances contained in the wastewater. Therefore, wastewater containing no metal ions or the like is supplied to the electrolyzer 5. As a result, metals such as iron hydroxide are not deposited on the electrodes of the electrolyzer 5 and, therefore, degradation of electrolysis capacity can be prevented. Furthermore, because the electrode cleaning frequency can be greatly decreased, the electrode wear is also reduced.

The electrolyzer is shaped, for example, to have a length of 17.5 m, a width of 7 m, and a height of 3 m, and has a plurality, for example 1040, cathode-anode electrode pairs disposed inside thereof. Of those electrodes, for example, cathodes are formed from a stainless steel and anodes are formed by coating titanium with a noble metal.

A prescribed DC voltage, for example 120 V, is applied between the anodes and cathodes.

When the ETA-containing wastewater passes between those electrodes, the ETA is decomposed. For example, in this process, the electric current density in the electrolyzer 5 is 10 A/m$^2$, the total electrode surface area is 160 m$^2$, and the temperature of the ETA-containing wastewater is 80° C. at 1 atm.

In the electrolysis of the ETA-containing wastewater, part of water is decomposed and a small amount of hydrogen and oxygen gases is generated. Those gases are released via a decomposition gas treatment apparatus 6 and diluted with air.

The wastewater that passed through the electrolyzer 5 within a certain time and was subjected to electrolysis is then supplied to a tank 7 for receiving the electrolyzed water.

Confirmation of COD concentration of the wastewater in this tank 7 is conducted with a water quality measurement apparatus 8. For example, a manganese method (CODMn method) employing potassium permanganate as an oxidizing agent is used for confirming the COD.

Once the COD concentration of the wastewater has been confirmed to be below the environmental discharge limit standard value, for example, below a COD-Mn value of 30 ppm (or 50 ppm calculated as ETA concentration), the wastewater is released (9) into environment.

Figure 2:
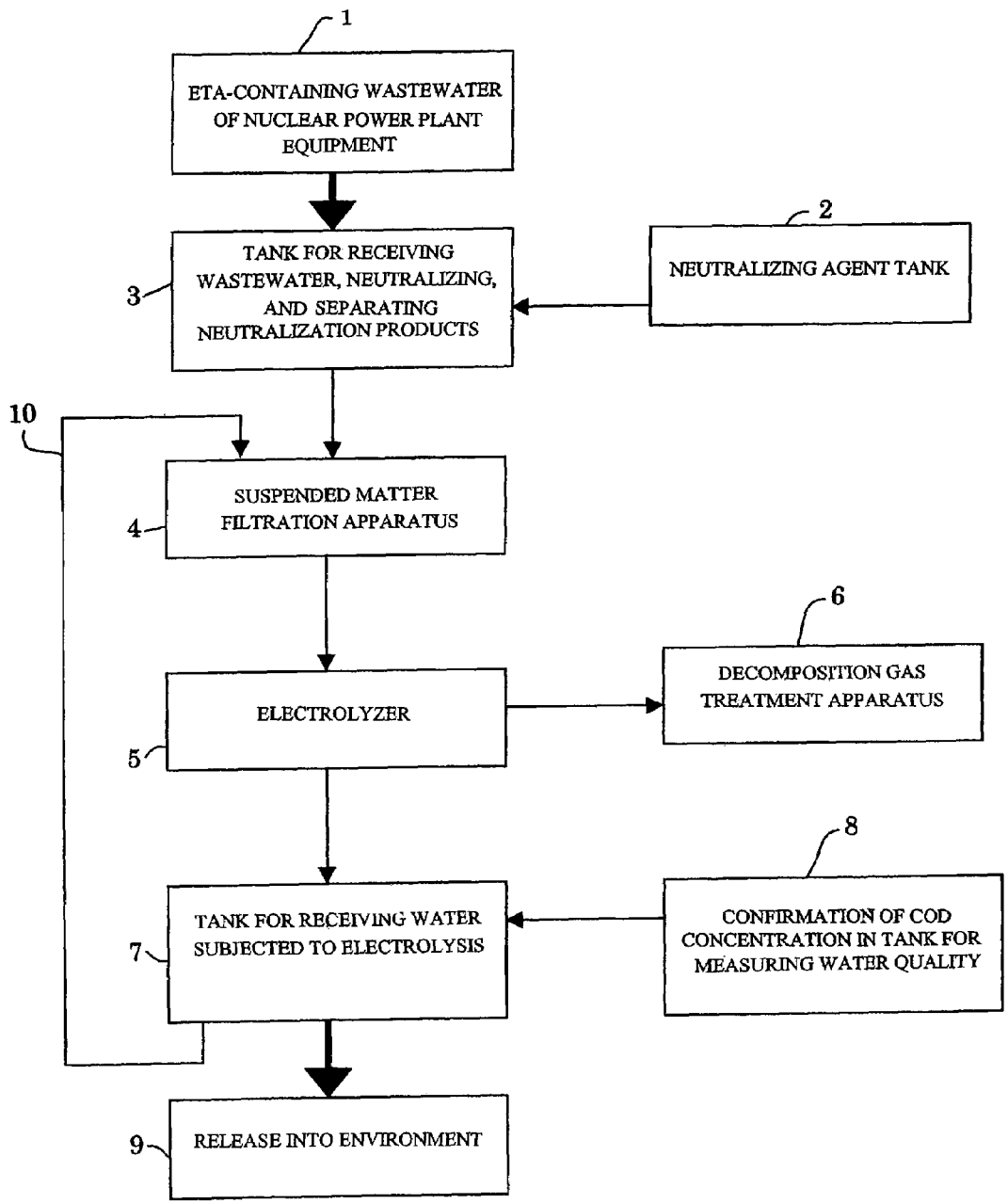
FIG. 2 is a block diagram illustrating a second embodiment of the present invention; this figure corresponds to FIG. 1.

The second embodiment of the present invention will be explained below with reference to FIG. 2. Components denoted by the same reference symbols as in FIG. 1 have the same names and functions.

The difference between this embodiment and the first embodiment is that the filtration apparatus 4 and the electrolyzed water receiving tank 7 are directly connected with a bypass tube 10.

This embodiment is advantageous in the case of a low treatment frequency. The electrolyzed ETA-containing wastewater is directly returned into the filtration apparatus 4 via the bypass tube 10, the ETA-containing wastewater is repeatedly passed through the electrolyzer 5 and ETA is decomposed.

Figure 3:
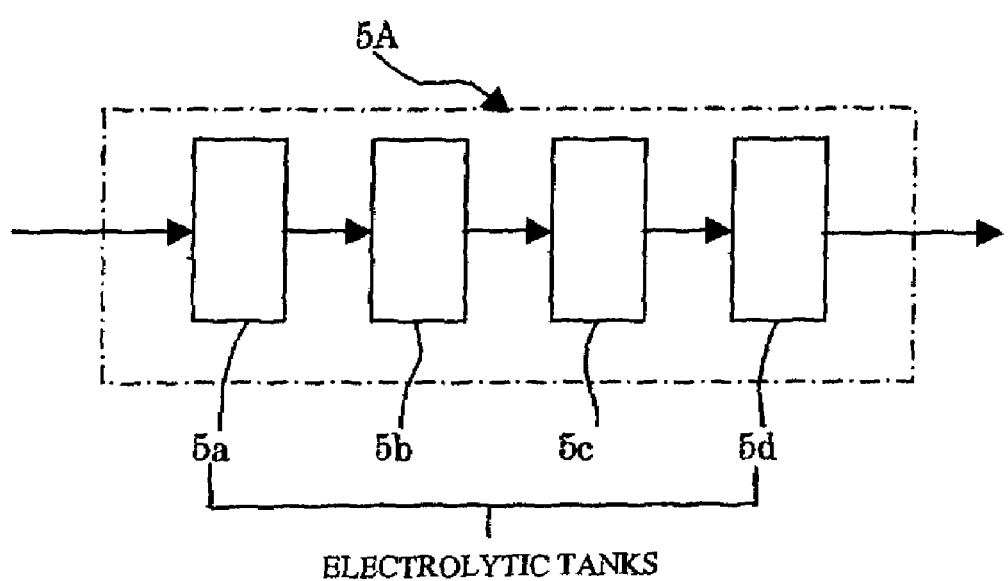
FIG. 3 is a block diagram illustrating a third embodiment of the present invention; this figure shows a multistage electrolyzer.

The second embodiment of the present invention will be explained below with reference to FIG. 3. Components denoted by the same reference symbols as in FIG. 1 have the same names and functions.

In this embodiment, a multistage electrolyzer 5A is used. This electrolyzer 5A is composed of a plurality of electrolytic tanks 5a–5d connected in a row. The structure of electrolytic tanks is identical to that of the electrolyzer 5.

If this multistage electrolyzer 5A is used, for example, when the ETA-containing wastewater is transferred from the electrolytic tank 5a to the electrolytic tank 5b, the transfer to the next electrolytic tank 5b can be conducted upon removal, e.g., of solids generated in the electrolytic tank 5a. Therefore, the deposition of metal components on the electrodes is extremely small.

Furthermore, in the multistage electrolyzer, the treatment capacity of the ETA-containing wastewater can be adjusted by increasing or decreasing the number of installed electrolytic tanks.

The present invention is not limited to the above-described embodiments. For example, a hydrochloric acid solution can be also used instead of the sulfuric acid solution as the ETA-containing wastewater. Further, the increase in the amount of the ETA-containing wastewater which is to be treated can be coped with by increasing the number of electrode pairs in the electrolyzer.

What is claimed is:

1. Method for treating ethanolamine (ETA)-containing wastewater which also contains mineral impurities and has a chemical oxygen demand (COD) exceeding the environmental discharge limit standard value, said method comprising the following steps carried out in the indicated order:
   a.) treating said ETA-containing wastewater with sodium hydroxide to a pH of 8 to 12.5;
   b.) precipitating and separating minerals in said ETA-containing wastewater;
   c.) filtering said wastewater; and
   d.) performing electrolysis of said wastewater in an electrolyzer to reduce chemical oxygen demand (COD) value of said wastewater to an environmentally acceptable discharge level.

2. Method for treating ETA-containing wastewater according to claim 1, wherein hydrogen gas and oxygen gas produced by said electrolysis are sent to a decomposition gas treatment unit and then released to atmosphere.

3. Method for treating ETA-containing wastewater according to claim 1, wherein said wastewater that has been electrolyzed is re-filtered and electrolyzed again.

4. Method for treating ETA-containing wastewater according to claim 1, wherein said electrolyzer is a multistage electrolyzer having a plurality of electrolytic treatment tanks fluidically serially connected.

5. Method for treating ETA-containing wastewater according to claim 1, wherein said wastewater is regenerator effluent from a pressurized water reactor (PWR) nuclear power plant.

6. Method for treating ETA-containing wastewater according to claim 1, wherein said wastewater contains at least one of hydrochloric acid and sulfuric acid.

* * * * *